US 12,474,746 B2

(12) United States Patent
Nakagaki

(10) Patent No.: US 12,474,746 B2
(45) Date of Patent: Nov. 18, 2025

(54) ELECTRONIC APPARATUS

(71) Applicant: Lenovo (Singapore) Pte. Ltd., Singapore (SG)

(72) Inventor: Yoshihito Nakagaki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 234 days.

(21) Appl. No.: 18/346,381

(22) Filed: Jul. 3, 2023

(65) Prior Publication Data

US 2024/0045480 A1    Feb. 8, 2024

(30) Foreign Application Priority Data

Aug. 8, 2022   (JP) .................................. 2022-126081

(51) Int. Cl.
*G06F 1/16*   (2006.01)
*F16C 11/04*  (2006.01)
*G06F 1/20*   (2006.01)
*H05K 7/20*   (2006.01)

(52) U.S. Cl.
CPC ............ *G06F 1/1681* (2013.01); *F16C 11/04* (2013.01); *G06F 1/203* (2013.01); *H05K 7/20336* (2013.01); *H05K 7/2039* (2013.01)

(58) Field of Classification Search
CPC ...... G06F 1/1681; G06F 1/203; G06F 1/1616; F16C 11/04; H05K 7/20336; H05K 7/2039

See application file for complete search history.

(56) References Cited

U.S. PATENT DOCUMENTS 5,251,105 A  * 10/1993 Kobayashi ............ G06F 1/1635
                                                          200/51.09
11,733,742 B2 * 8/2023 North ..................... G06F 1/1688
                                                          361/679.02

FOREIGN PATENT DOCUMENTS

| JP | 2003-167525 A | 6/2003 |
| JP | 2004-240995 A | 8/2004 |
| JP | 2014-146306 A | 8/2014 |
| JP | 6807989 B1    | 1/2021 |

* cited by examiner

*Primary Examiner* — Imani N Hayman
*Assistant Examiner* — Hung Q Dang
(74) *Attorney, Agent, or Firm* — Osha Bergman Watanabe & Burton LLP

(57) ABSTRACT

An electronic apparatus includes: a first chassis; a second chassis that is mounted with a display; and a hinge device that relatively rotatably connects one edge portions of the first chassis and the second chassis to each other. A protruding portion in which a portion except for both side portions in a longitudinal direction protrudes toward a rear side is provided in the one edge portion of the first chassis. The hinge device includes a pair of hinge shafts that are connected to both end surfaces of the protruding portion in the longitudinal direction, and relatively rotatably connect the protruding portion and the second chassis, and a pair of hinge arms that integrally fix each of the pair of hinge shafts and the one edge portion of the second chassis.

8 Claims, 13 Drawing Sheets

ELECTRONIC APPARATUS

CROSS-REFERENCE TO RELATED APPLICATIONS

This application claims priority to Japanese Patent Application No. 2022-126081 filed on Aug. 8, 2022, the contents of which are hereby incorporated by reference in its entirety.

BACKGROUND

Technical Field

The present invention relates to an electronic apparatus.

Description of Related Art

In an electronic apparatus such as a laptop PC, a hinge device usually connects a first chassis mounted with a keyboard and a second chassis mounted with a display. In such an electronic apparatus, there is a configuration in which a display (sub-display) is provided in the first chassis in addition to the display (main display) (see, for example, Japanese Patent Publication No. 6807989). For example, it is possible to display, a tab that is not displayed on the main display, a thumbnail of each application, and the like on a sub-display.

The sub-display having the configuration in Japanese Patent Publication No. 6807989 described above is capable of being used only in a state where the first chassis and the second chassis are opened. That is, the sub-display is capable of being used only when the main display is used.

By the way, there is also a demand for the sub-display to display information, such as notification of e-mail or chat, a schedule, a remaining battery capacity, or the like, that is desired to be confirmed even in a state where the first chassis and the second chassis are closed. Therefore, it is conceivable to install the sub-display on, for example, the rear surface of the second chassis. However, in this case, it is not possible to substantially use the sub-display when the main display is used.

SUMMARY

One or more embodiments of the present invention provide an electronic apparatus that is capable of using a sub-display regardless of a rotation angle between chassis.

An electronic apparatus according to the first aspect of the present invention includes: a first chassis; a second chassis that is mounted with a display; and a hinge device that relatively rotatably connects one edge portions of the first chassis and the second chassis to each other, in which a protruding portion in which a portion except for both side portions in a longitudinal direction protrudes toward a rear side is provided in the one edge portion of the first chassis, the hinge device includes a pair of hinge shafts that are connected to both end surfaces of the protruding portion in the longitudinal direction, and relatively rotatably connect the protruding portion and the second chassis, and a pair of hinge arms that integrally fix each of the pair of hinge shafts and the one edge portion of the second chassis, and a sub-display is further included that is mounted on the protruding portion and faces a front surface of the protruding portion.

The above-described aspect of present invention can provide a sub-display regardless of a rotation angle between chassis.

DETAILED DESCRIPTION

An electronic apparatus according to the present invention will be described in detail below with preferred embodiments with reference to the accompanying drawings.

First, an electronic apparatus 10 according to a first embodiment will be described.

Figure 1:
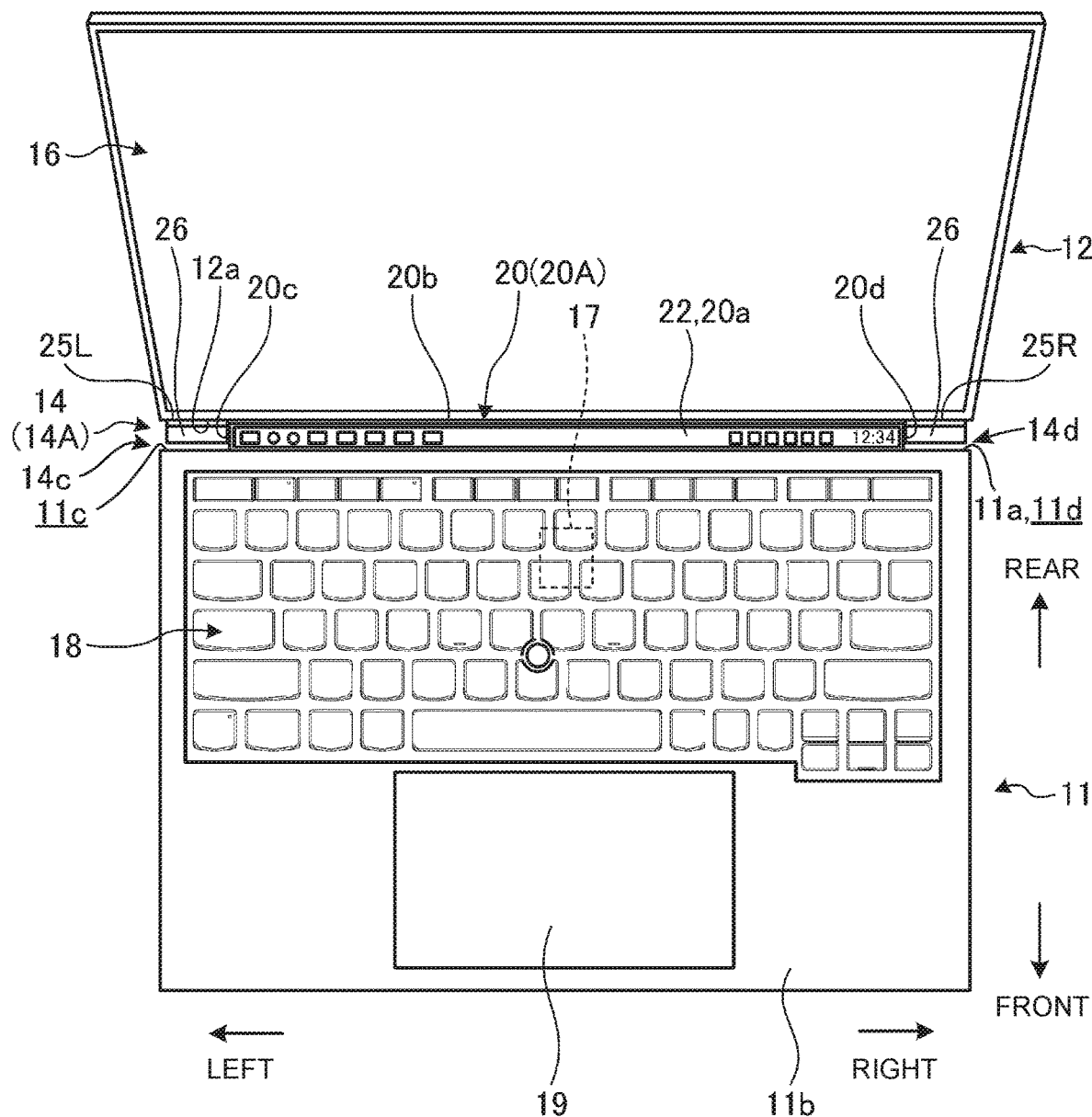
FIG. 1 is a schematic plan view looking down from above with an electronic apparatus according to a first embodiment in a 120-degree posture.
Figure 2:
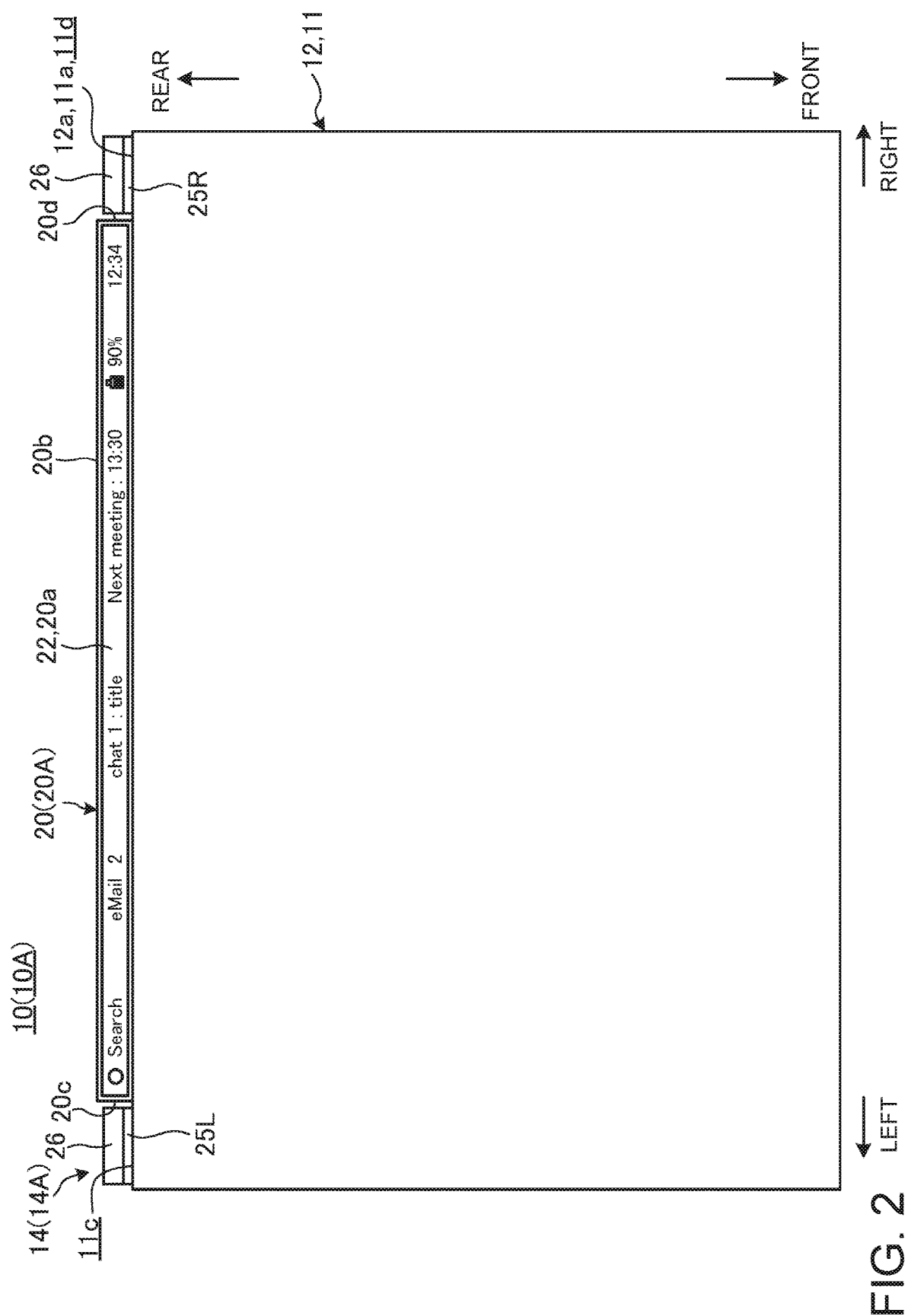
FIG. 2 is a plan view of the electronic apparatus illustrated in FIG. 1 in a 0-degree posture.

FIG. 1 is a schematic plan view looking down from above with an electronic apparatus 10 according to a first embodiment in a 120-degree posture. FIG. 2 is a plan view of the electronic apparatus 10 illustrated in FIG. 1 in a 0-degree posture. As illustrated in FIGS. 1 and 2, the electronic apparatus 10 is a clamshell type laptop PC in which a first chassis 11 and a second chassis 12 are relatively rotatably connected by a hinge device 14.

The second chassis 12 is a box-shaped chassis that is thinner than the first chassis 11. The second chassis 12 includes a touch panel type display 16. The display 16 is a main display of the electronic apparatus 10 and is constituted by, for example, an organic EL, a liquid crystal, or the like.

Hereinafter, with respect to the first chassis 11 and each component provided therein, description will be performed in such a way that, in a direction viewed from a user who operates a keyboard 18 while visually recognizing the display 16, a front side is referred to as front, a back side is referred as rear, a thickness direction of the first chassis 11 is referred to as top and bottom, and a width direction is referred to as left and right.

The first chassis 11 is a thin box-shaped chassis. In the first chassis 11 and the second chassis 12, one edge portions 11a and 12a are connected to each other by a hinge device 14. The one edge portion 11a of the first chassis 11 is a rear edge portion extending along the left and right.

A motherboard, on which a CPU 17 and the like are mounted, a memory, a battery device, and the like are accommodated inside the first chassis 11. The keyboard 18 and a touch pad 19 are provided on the top surface 11b of the first chassis 11. The keyboard 18 may be a mechanical type having a plurality of key tops capable of performing top-to-bottom movement, or may be a software type displayed on a touch panel type display. The top surface 11b of the first chassis 11 may have a configuration provided with a large-screen display similar to the display 16 instead of the keyboard 18. As the keyboard 18, the above-described software type may be displayed on the display.

The one edge portion 11a of the first chassis 11 is provided with a protruding portion 20 that protrudes toward the rear side. In the protruding portion 20, most of the one edge portion 11a of the first chassis 11 except for both side portions (left and right portions) in the longitudinal direction protrudes toward the rear side. As a result, the first chassis 11 has a pair of recessed portions 11c and 11d in which the left and right rear corner portions are notched in a rectangular shape, respectively. The recessed portions 11c and 11d serve as installation spaces for the hinge device 14.

Figure 3A:
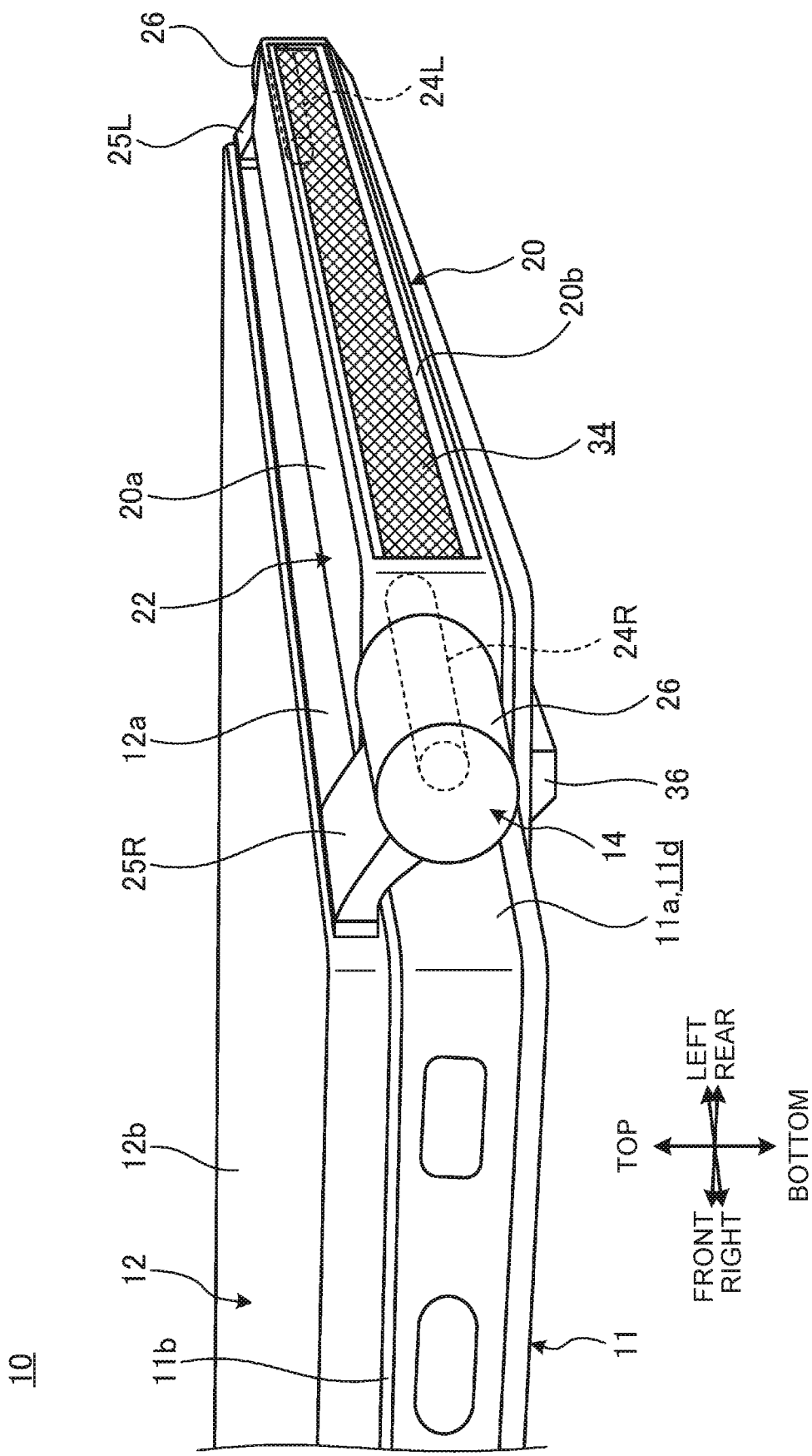
FIG. 3A is an enlarged schematic perspective view of the protruding portion and the peripheral portion thereof in the posture.
Figure 3B:
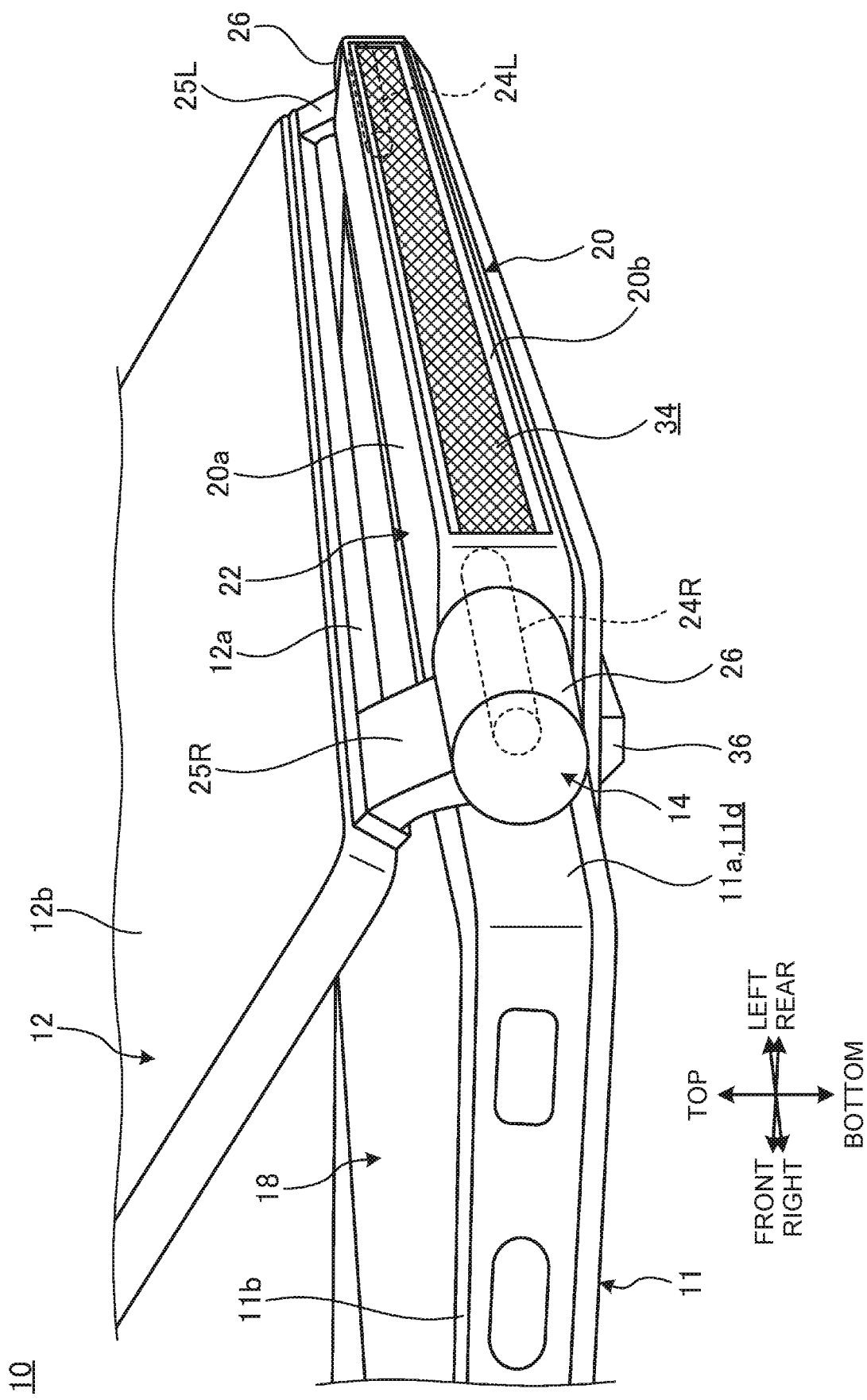
FIG. 3B is a perspective view in a state where the chassis illustrated in FIG. 3A is in a 30-degree posture.
Figure 3C:
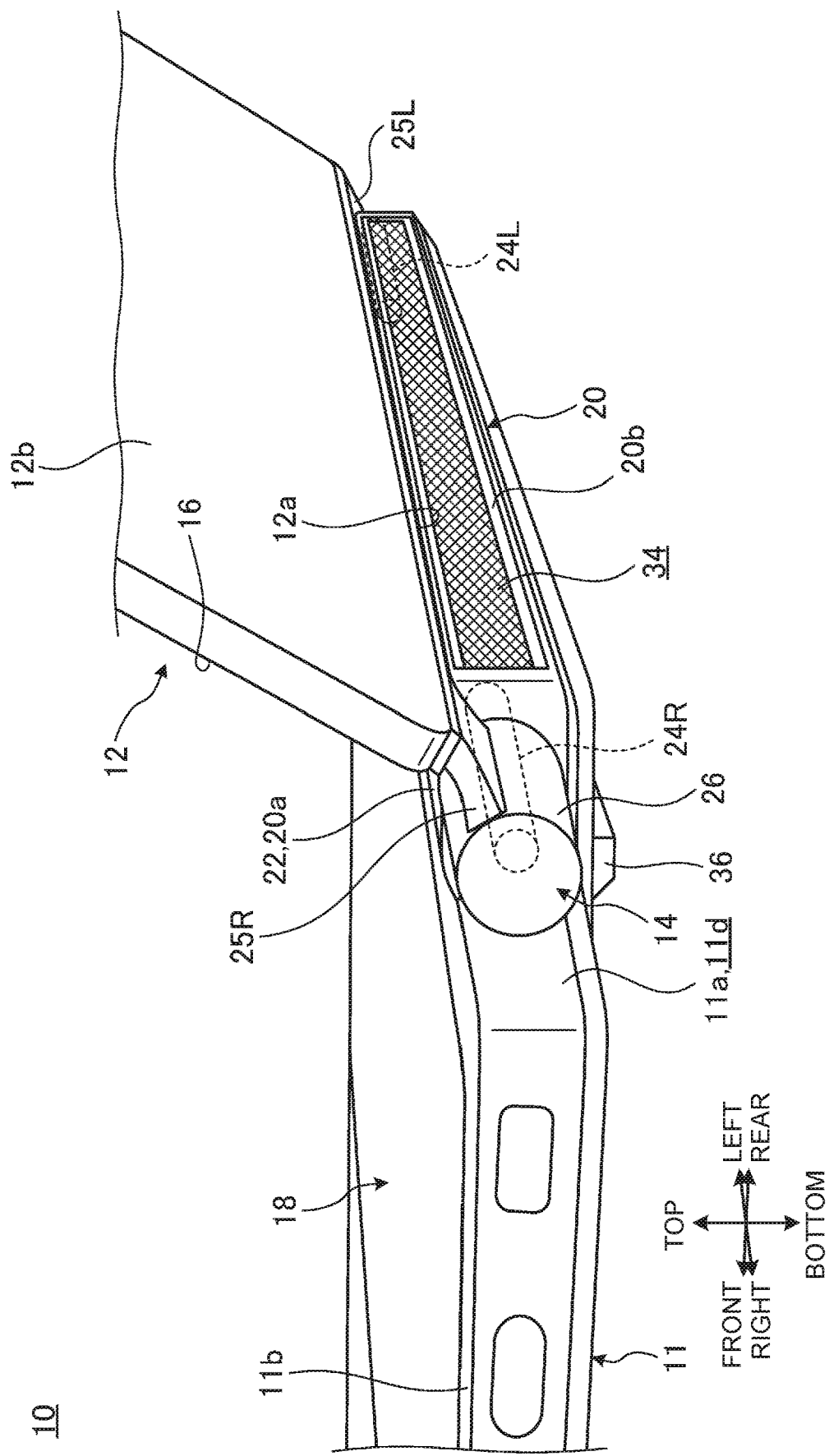
FIG. 3C is a perspective view in a state where the chassis illustrated in FIG. 3A is in the 120-degree posture.
Figure 4A:
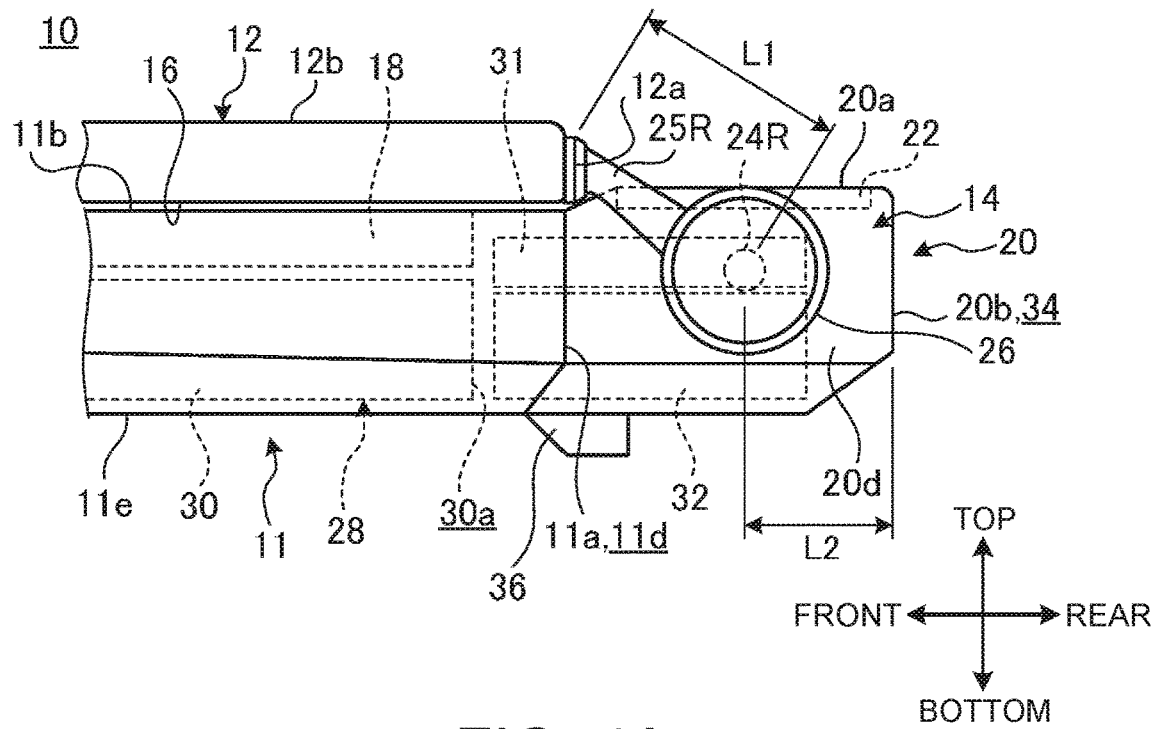
FIG. 4A is an enlarged schematic side view of the protruding portion and the peripheral portion thereof in the 0-degree posture.
Figure 4B:
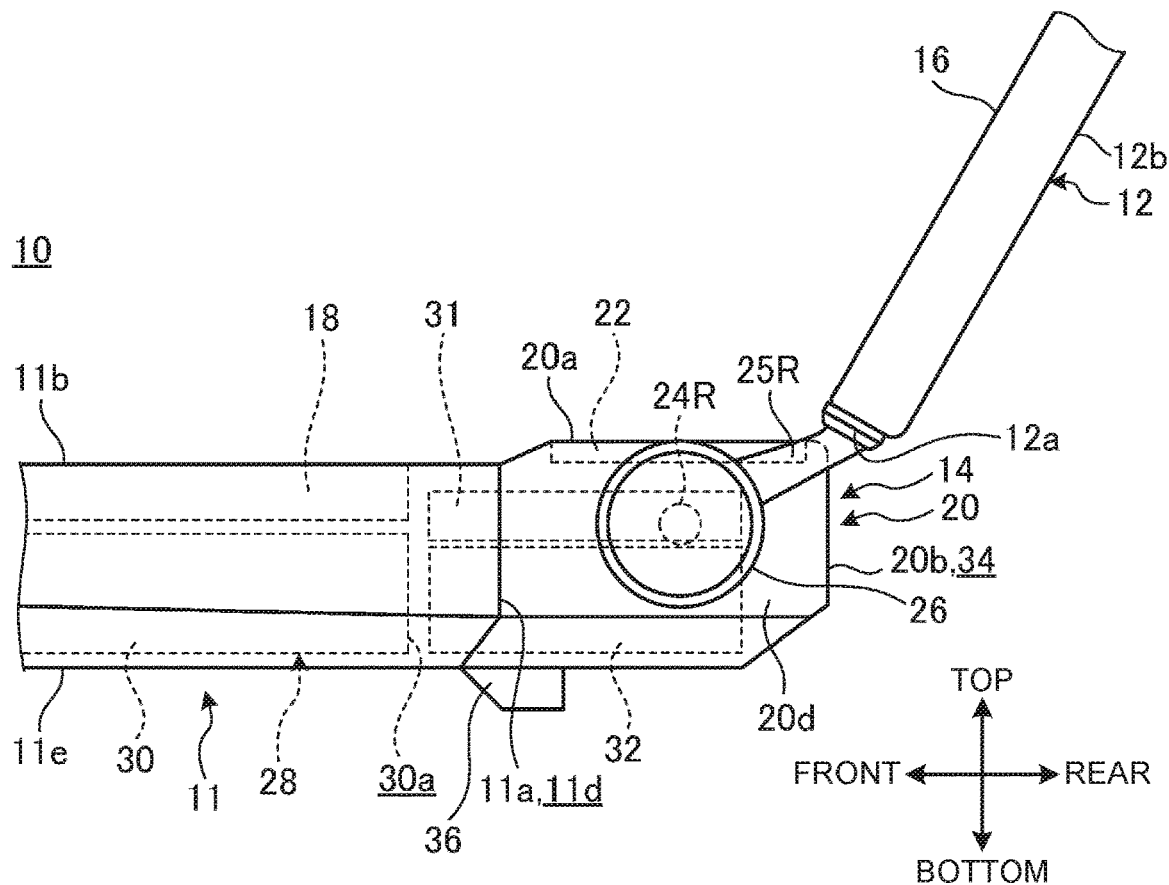
FIG. 4B is a side view in a state where the chassis illustrated in FIG. 4A is in the 120-degree posture.
Figure 4C:
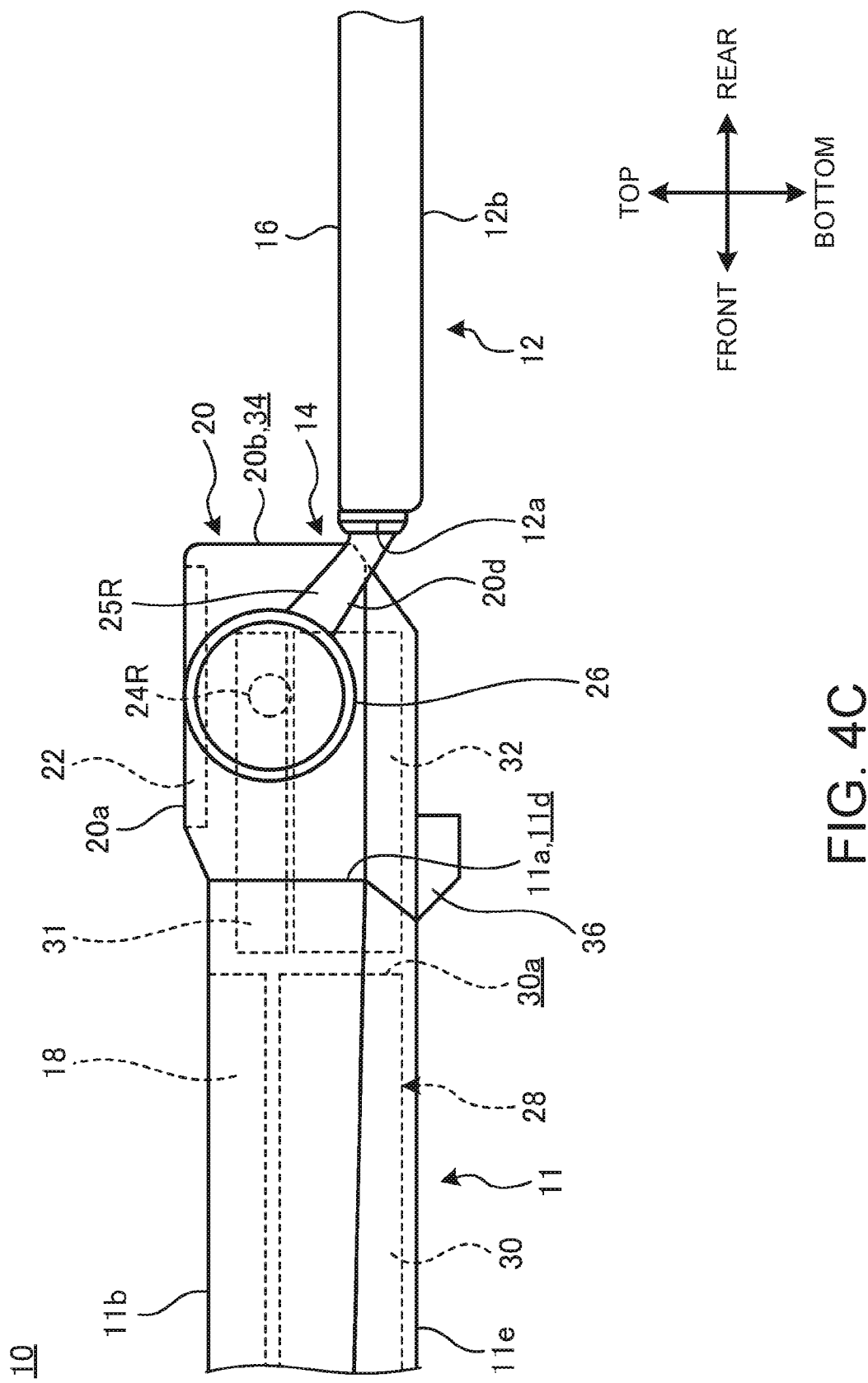
FIG. 4C is a side view in a state where the chassis illustrated in FIG. 4A is in a 180-degree posture.

FIG. 3A is an enlarged schematic perspective view of the protruding portion 20 and the peripheral portion thereof in the 0-degree posture. FIGS. 3B and 3C are perspective views in a state where the chassis 11 and 12 illustrated in FIG. 3A are in the 30-degree posture and the 120-degree posture, respectively. FIG. 4A is an enlarged schematic side view of the protruding portion 20 and the peripheral portion thereof in the 0-degree posture. FIGS. 4B and 4C are side views in a state where the chassis 11 and 12 illustrated in FIG. 4A are in the 120-degree posture and the 180-degree posture, respectively. In FIGS. 3B and 3C, each key top of the keyboard 18 is not illustrated.

In the present application, for convenience of description, the angular posture between the chassis 11 and 12 by the hinge device 14 is a state where the second chassis 12 is laminated on the top surface 11b of the first chassis 11 and is closed, and a posture in which the display 16 faces the keyboard 18 is called a 0-degree posture (see FIGS. 2, 3A, and 4A). Description will be performed while carving an angle in an open direction in which the second chassis 12 rotates based on the 0-degree posture. Regarding a method of referring to the 0-degree posture, the 30-degree posture, the 120-degree posture, the 180-degree posture, and the like, the angle may of course slightly deviate from the accurate angle indicated by an angle number depending on the structures of the chassis 11 and 12, the hinge device 14, and the like. In the present application, these deviated angles are also referred to as the 0-degree posture and the like.

As illustrated in FIGS. 1 and 2, the sub-display 22 is mounted on the protruding portion 20. The sub-display 22 faces the top surface 20a of the protruding portion 20 (see FIGS. 3A and 4A). The sub-display 22 is a small touch panel type display smaller than the display 16 and is configured with, for example, an organic EL, a liquid crystal, or the like.

The top surface 20a of the protruding portion 20 is continued on the rear side of the top surface 11b of the first chassis 11 facing the keyboard 18. That is, the sub-display 22 is located on the top surface 11b of the first chassis 11 on the rear side of the keyboard 18 or a display provided instead of the keyboard 18. In the case of the present embodiment, the top surface 20a of the protruding portion 20 is disposed slightly above the top surface 11b (see FIG. 4A). The top surface 20a may be flush with the top surface 11b or may be slightly below.

As illustrated in FIGS. 1 to 4C, the hinge device 14 includes a pair of left and right hinge shafts 24L and 24R, and a pair of left and right hinge arms 25L and 25R. The hinge shaft 24L and the hinge arm 25L on the left are disposed at the left end portion of the protruding portion 20 and the recessed portion 14c on the left. The hinge shaft 24R and the hinge arm 25R on the right are disposed at the right end portion of the protruding portion 20 and the recessed portion 14d on the right.

Since the configuration of the left and right hinge shafts 24L and 24R and the peripheral portions thereof may have a bilaterally symmetrical structure, the two may be hereinafter referred to as a "hinge shaft 24" without distinction. Similarly, the left and right hinge arms 25L and 25R may also be referred to as a "hinge arm 25".

The hinge shaft 24 is a metal shaft that serves as a hinge shaft of the hinge device 14. The hinge shaft 24L on the left has a first end portion that is disposed in the recessed portion 11c, and a second end portion that penetrates the left end surface 20c of the protruding portion 20 and is inserted into the protruding portion 20. The hinge shaft 24R on the right has a first end portion that is disposed in the recessed portion 11d, and a second end portion that penetrates the right end surface 20d of the protruding portion 20 and is inserted into the protruding portion 20.

The first end portion of the hinge shaft 24 is connected with the hinge arm 25 in a relatively non-rotatable state. That is, the hinge arm 25 rotates integrally with the hinge shaft 24. The second end portion of the hinge shaft 24 is supported in the protruding portion 20 by a torque generator fixed to the first chassis 11. That is, the hinge shaft 24 is capable of relatively rotating with respect to the first chassis 11 with a predetermined rotational torque. The torque generator may have the same or a similar configuration as, for example, a torque generator 47 illustrated in FIG. 8.

The hinge arm 25 is a member that connects the hinge shaft 24 and the second chassis 12. The first end portion of the hinge arm 25 is connected to the one edge portion 12a of the second chassis 12 in the relatively non-rotatable state. The first end portion of the hinge arm 25 may be fixed to the second chassis 12 with the same or similar configuration as, for example, the hinge arm 25R illustrated in FIG. 8. The second end portion of the hinge arm 25 is fixed to the first end portion of the hinge shaft 24 to be relatively non-rotatable via the hinge cap 26. As a result, the second chassis 12 rotates integrally with the hinge arm 25 and the hinge shaft 24. The hinge cap 26 is a decorative member that covers the first end portion of the hinge shaft 24 disposed in the recessed portions 11c and 11d, and is integrally formed with the first end portion.

In the 0-degree posture illustrated in FIGS. 3A and 4A, the hinge arm 25 connects the hinge shaft 24 that is provided on the end surfaces 20c and 20d of the protruding portion 20 and the one edge portion 12a of the second chassis 12 in front of the hinge shaft 24. Therefore, the hinge arm 25 has a shape that is gradually inclined above toward the front in the 0-degree posture. As a result, the hinge arm 25 does not stand out in appearance in the 0-degree posture, and the design of the electronic apparatus 10 is not deteriorated. The hinge arm 25 may be formed, for example, in an L-shape or the like in a side view, which protrudes above from the hinge shaft 24 and then bends forward.

As illustrated in FIGS. 4A to 4C, the electronic apparatus 10 is mounted with a cooling device 28 for cooling the CPU 17 which is a heating element in the first chassis 11. The cooling device 28 includes a fan 30, a heat pipe 31, and a heat sink 32.

The fan 30 is a centrifugal fan disposed below the keyboard 18 at a position closer to the rear side in the first chassis 11. An air outlet 30a on the rear surface of the fan 30 discharges the air inside and outside the chassis 12, the air being sucked from the top-to-bottom surfaces. The heat pipe 31 is a heat transport device in which a working fluid is enclosed inside a closed space. The heat pipe 31 has a first end portion that is connected to the CPU 17 and a second end portion that is connected to the top surface of the heat sink 32. The second end portion of the heat pipe 31 may be connected to the bottom surface of the heat sink 32. The heat pipe 31 is capable of transporting the heat of the CPU 17 to the heat sink 32 with high efficiency by circulating the working fluid while changing phase in the closed space. The heat sink 32 has a structure in which a plurality of fins formed of aluminum or copper are arranged left and right and stand upright. The heat sink 32 is disposed immediately behind the air outlet 30a of the fan 30 and the air from the air outlet 30a circulates, so that it is possible to efficiently radiate the heat transported by the heat pipe 31.

In the electronic apparatus 10 of the present embodiment, most of the heat pipe 31 and the heat sink 32 are accommodated in the protruding portion 20. As illustrated in FIG. 4A, the heat pipe 31 and the heat sink 32 of the present embodiment have a front end portion disposed on the rear side rather than the rear end surface of the keyboard 18 and a rear end portion disposed in the protruding portion 20. As a result, in the electronic apparatus 10, it is possible to greatly increase, in particular, the height of the heat sink 32 as compared with the laptop PC according to the related art, an improvement of the cooling efficiency is realized by expanding a heat radiation area.

That is, the keyboard 18 has a large external area and a certain degree of thickness in the first chassis 11. Therefore, in a laptop PC according to the related art, which does not have the protruding portion 20, not only the fan but also the heat sink and the heat pipe are disposed under the keyboard 18. Therefore, the height of the heat sink is severely restricted, so that it is difficult to expand the heat radiation area. In this respect, in the electronic apparatus 10 of the present embodiment, it is possible to dispose the heat sink 32 at the protruding portion 20 and at a position that does not overlap the keyboard 18 in the top-to-bottom direction. Therefore, the heat sink 32 is not affected by the thickness of the keyboard 18. Here, the sub-display 22 is a liquid crystal or an organic EL, and is significantly thinner than the keyboard 18. For example, when the keyboard 18 is about 4 mm, the sub-display 22 is equal to or less than 2 mm. Therefore, in the electronic apparatus 10, it is possible to easily extend the height of the heat sink 32, which is offset disposed on the rear side of the keyboard 18 by using the protruding portion 20. At least a part of the heat pipe 31 and the heat sink 32 may be disposed in the protruding portion 20, and the entirety thereof may be accommodated in the protruding portion 20.

As illustrated in FIGS. 3A to 3C, the protruding end surface (rear side surface) 20b of the protruding portion 20 is, for example, provided with an exhaust port 34 extending over the entire length on the left and right. The exhaust port 34 is formed with an opening on the protruding end surface 20b, and is covered with mesh or slits so as to allow ventilation. The exhaust port 34 faces the rear surface (air discharge surface) of the heat sink 32. Therefore, the air that has passed through the heat sink 32 from the fan 30 is smoothly discharged to the outside of the first chassis 11 through the exhaust port 34. The exhaust port 34 may be provided only at a part of the protruding end surface 20b which faces the heat sink 32.

Next, the operation and effects of the electronic apparatus 10 of the present embodiment will be described.

First, in the 0-degree posture illustrated in FIGS. 3A and 4A, the one edge portion 12a of the second chassis 12 is disposed substantially evenly with the one edge portion 11a of the first chassis 11 top and bottom. That is, in the 0-degree posture, the positions of the one edge portions 11a and 12a in the front-rear direction substantially match each other. As a result, the protruding portion 20 is disposed to protrude to the rear side from the one edge portions 11a and 12a.

As a result, the sub-display 22 is not covered by the second chassis 12 and is exposed in appearance (see also FIG. 2). Therefore, the electronic apparatus 10 is capable of using the sub-display 22 even in the 0-degree posture in which the second chassis 12 is closed on the first chassis 11 and the display 16 is not used. As illustrated in FIG. 2, in the 0-degree posture, the sub-display 22 may display, for example, "a search field (search)", "the number of notifications of e-mail (eMail)", a "chat thumbnail (chat)", a "meeting schedule (next meeting)", a "remaining battery capacity", a "clock", and the like.

As a result, in the electronic apparatus 10, a user is capable of visually recognizing and using various kinds of information even in a state where the chassis 11 and 12 are closed, so that high convenience can be obtained. In the 0-degree posture, the exhaust port 34 is not blocked by the second chassis 12, and thus the cooling efficiency of the cooling device 28 is also high.

Next, when the second chassis 12 is rotated from the 0-degree posture in the opening direction, the second chassis 12 is gradually raised while using the hinge arm 25 and the hinge shaft 24 as the center of rotation (see FIG. 3B). Then, for example, in the 120-degree posture (or an angle in the vicinity of the posture) illustrated in FIGS. 3C and 4B, the electronic apparatus 10 is in an optimum aspect for operating the keyboard 18 while visually recognizing the display 16.

At this time, the second chassis 12 is disposed on the rear side of the protruding portion 20 (see FIG. 4B). Specifically, the second chassis 12 has one edge portion 11a disposed in the vicinity of a corner portion between the protruding end surface 20b and the top surface 20a of the protruding portion 20, and is disposed on the rear side rather than the protruding portion 20 as a whole.

As a result, in the electronic apparatus 10, the sub-display 22 is not covered by the second chassis 12 even in the 120-degree posture, and is exposed in appearance (see also FIG. 1). Therefore, the electronic apparatus 10 is capable of using the sub-display 22 even in a normal usage aspect in which it is possible to use the display 16 and the keyboard 18. As illustrated in FIG. 1, in the 120-degree posture, the sub-display 22 is positioned directly below and immediately in front of the display 16. Therefore, it is possible to use the sub-display 22 as, for example, an extended display of the display 16. In this case, the sub-display 22 may display, for example, a task bar function corresponding to a desktop screen displayed on the display 16. In other words, on the sub-display 22, it is possible to display a start button, a running application, an active holder, IME, various icons, a clock, and the like.

As a result, in the electronic apparatus 10, even in a state where the chassis 11 and 12 are open, the user is capable of visually recognizing and using the various types of information, and even higher convenience can be obtained. Since the exhaust port 34 is not blocked by the second chassis 12 even in the 120-degree posture, the cooling efficiency of the cooling device 28 is high (see FIG. 3C).

Next, when the second chassis 12 is further rotated from the 120-degree posture in the opening direction, the second chassis 12 gradually starts to lie to the rear side while using the hinge arm 25 and the hinge shaft 24 as the center of rotation (see FIG. 4C). In the 180-degree posture illustrated in FIG. 4C, in the electronic apparatus 10, the second chassis 12 is located on the rear side of the first chassis 11 and surface normal directions are substantially parallel to each other.

At this time, the second chassis 12 is disposed at a low position on the rear side of the protruding portion 20. Specifically, the second chassis 12 has one edge portion 11a that is disposed on the rear side of the bottom end portion of the protruding end surface 20b. As a result, the rear surface 12b of the second chassis 12 is disposed substantially parallel to the bottom surface 11e of the first chassis 11. Reference numeral 36 in FIG. 4C or the like is a rubber leg fixed to the bottom surface 11e, and serves as a leg portion when the electronic apparatus 10 is placed on a top surface of a desk or the like.

As a result, in the electronic apparatus 10, it is possible to use the display 16 and the sub-display 22 in combination even in the 180-degree posture in the same manner as in the case of the 120-degree posture described above, so that high convenience may be obtained. Since the exhaust port 34 is not blocked by the second chassis 12 even in the 180-degree posture, the cooling efficiency of the cooling device 28 is high (see FIG. 4C).

By the way, as illustrated in FIGS. 4A to 4C, when the second chassis 12 rotates from the 0-degree posture toward the 180-degree posture, the second chassis 12 turns so as to straddle the protruding portion 20 from the front side to the rear side without interfering with the protruding portion 20. Therefore, as illustrated in FIG. 4A, it is necessary that the length L1 from the center of the hinge shaft 24 to the tip end of the hinge arm 25 connected to the one edge portion 11a of the second chassis 12 is longer than the distance L2 between the center of the hinge shaft 24 and the protruding end surface 20b of the protruding portion 20. As a result, the pair of hinge arms 25L and 25R are provided to be rotatable in a state of straddling the protruding portion 20 in the longitudinal direction (left-right direction) therebetween. Then, when the pair of hinge arms 25L and 25R rotate, the second chassis 12 rotates such that the one edge portion 12a wraps around the protruding end surface 20b of the protruding portion 20. As a result, the electronic apparatus 10 enables a smooth rotational movement of the second chassis 12 in a state where the sub-display 22 mounted on the protruding portion 20 is always exposed in appearance.

Next, an electronic apparatus 10A according to a second embodiment will be described.

Figure 5:
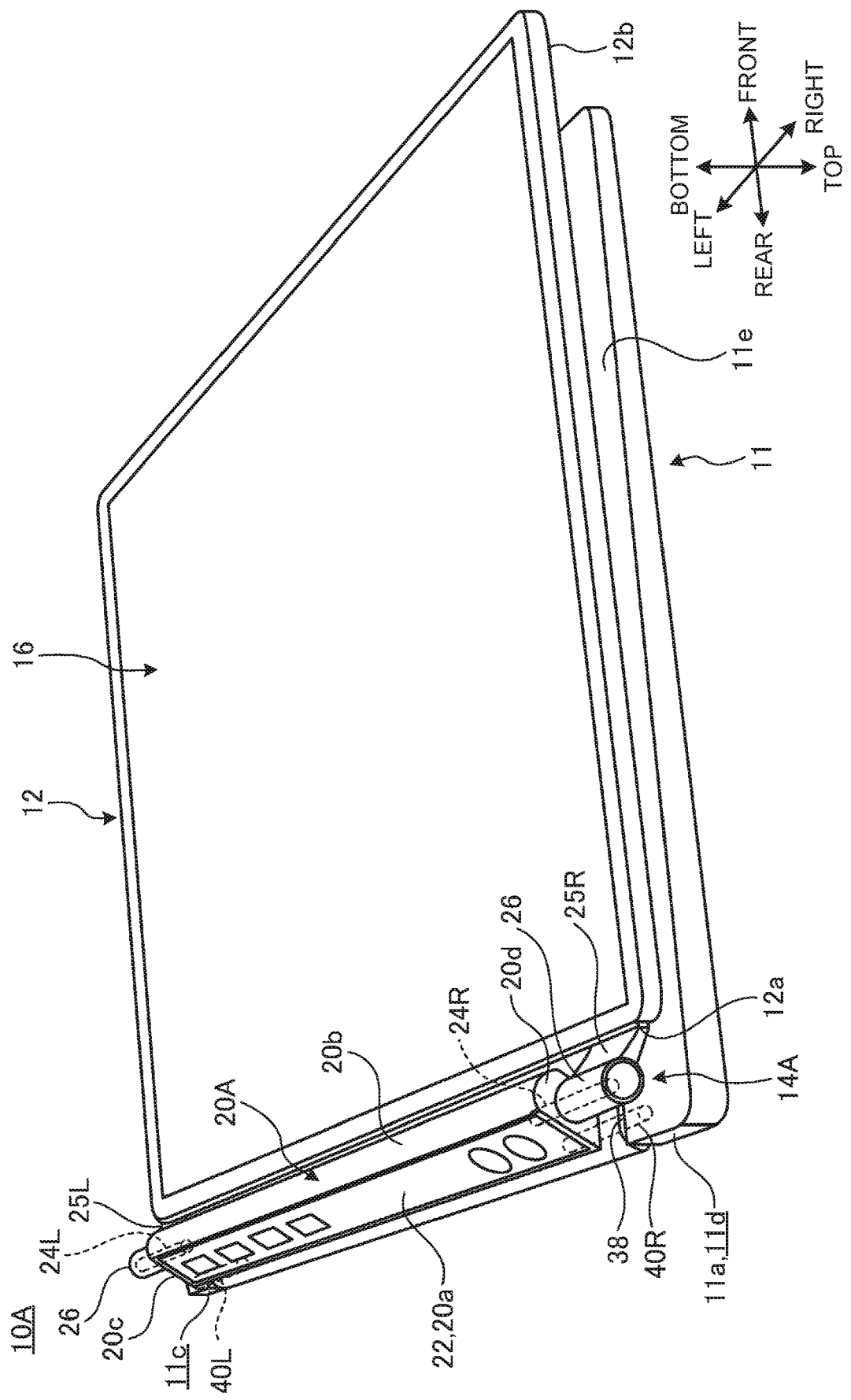
FIG. 5 is a schematic perspective view of an electronic apparatus according to a second embodiment as viewed from a display side in a 360-degree posture.
Figure 6A:
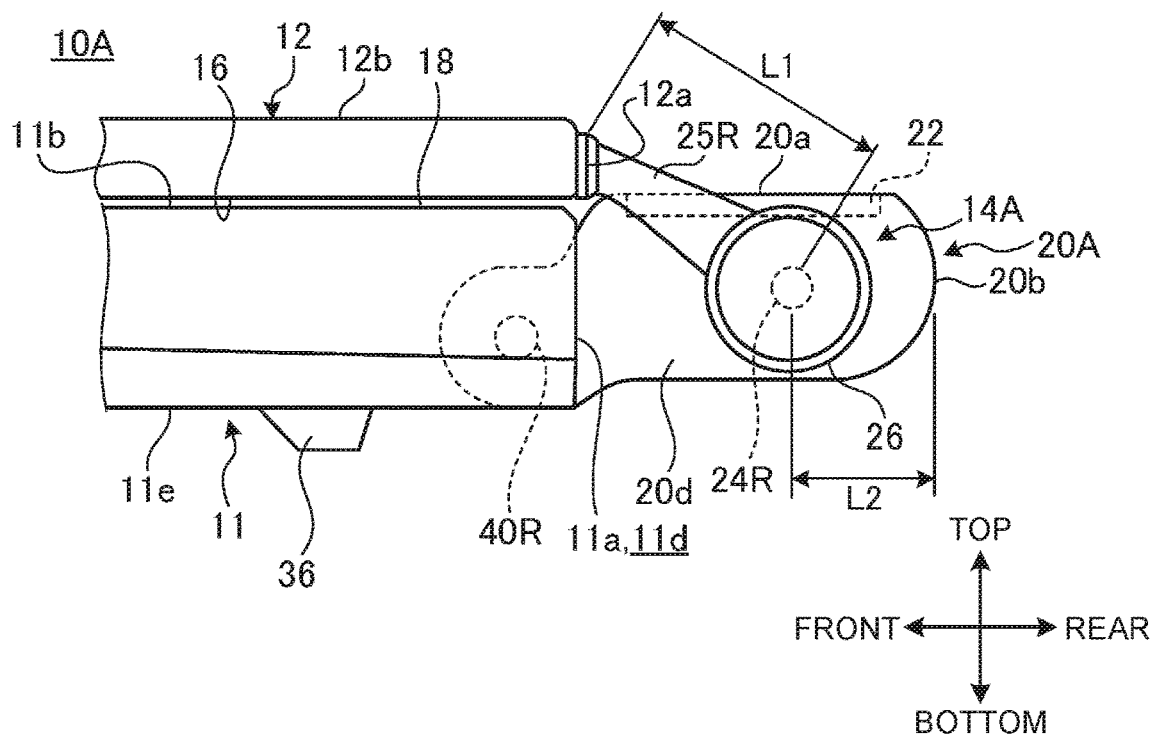
FIG. 6A is an enlarged schematic side view of the protruding portion and the peripheral portion thereof in the 0-degree posture.
Figure 6B:
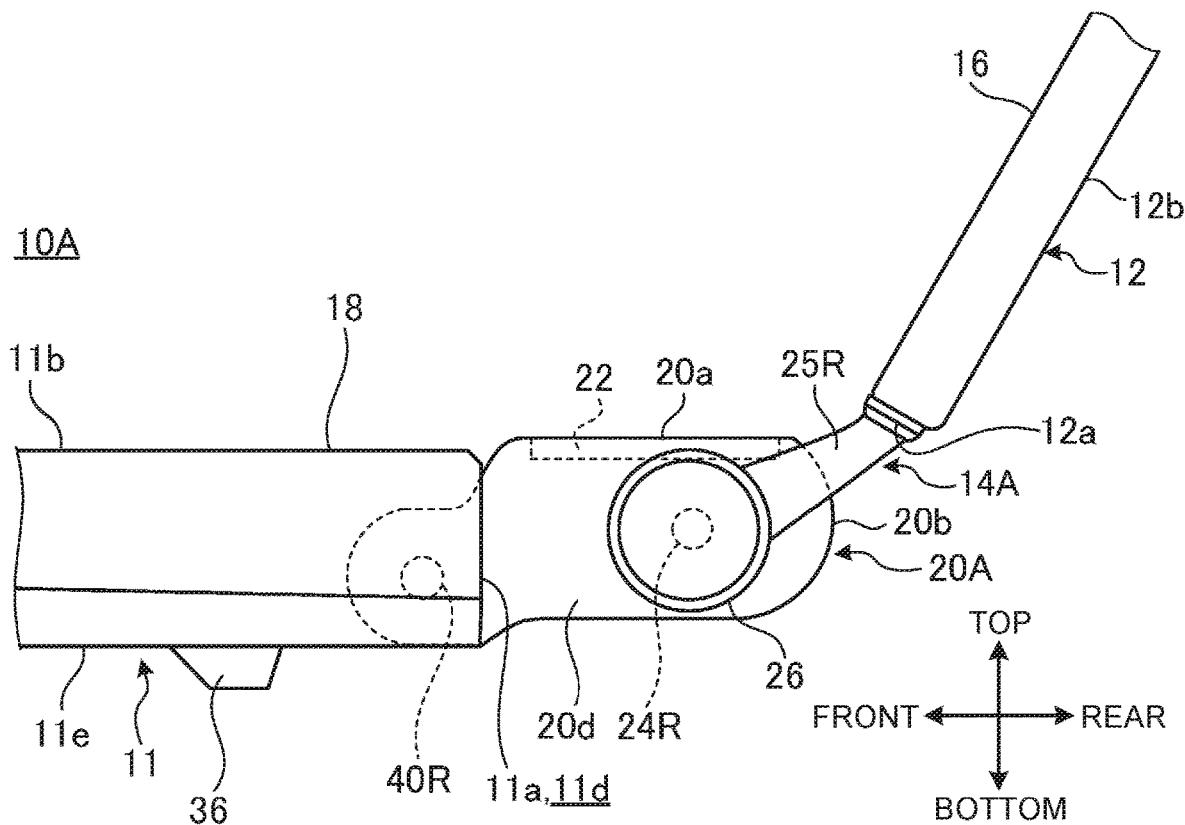
FIG. 6B is a side view in a state where the chassis illustrated in FIG. 6A is in a 120-degree posture.
Figure 6C:
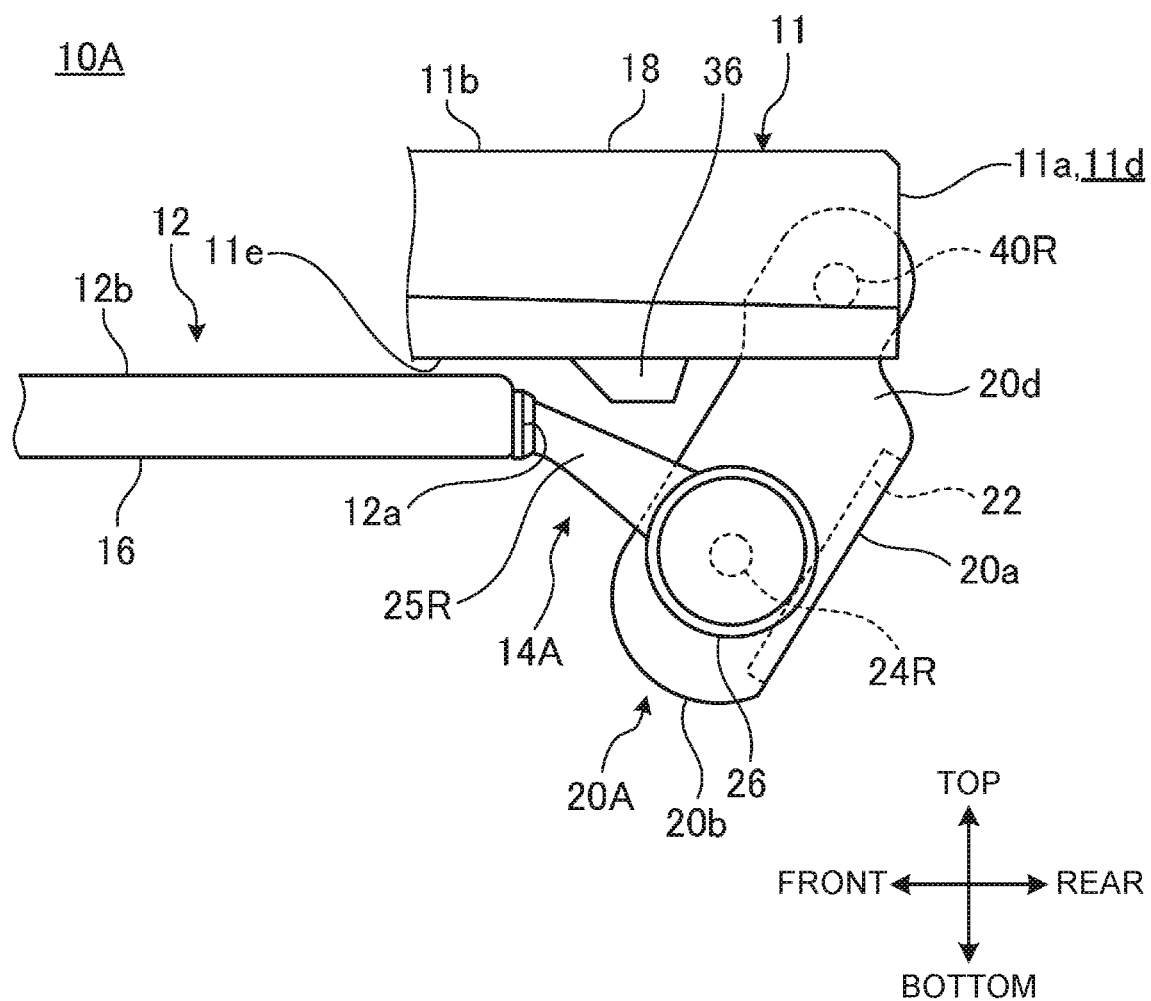
FIG. 6C is a side view in a state where the chassis illustrated in FIG. 6A is in a 360-degree posture.

FIG. 5 is a schematic perspective view of the electronic apparatus 10A according to the second embodiment as viewed from the side of the display 16 in a 120-degree posture. FIG. 6A is an enlarged schematic side view of the protruding portion 20A and the peripheral portion thereof in the 0-degree posture. FIGS. 6B and 6C are side views in a state where the chassis 11 and 12 illustrated in FIG. 6A are in the 120-degree posture and the 120-degree posture, respectively. In the electronic apparatus 10A according to the second embodiment, the same reference numerals will be given to elements that have the same or similar functions and effects as the electronic apparatus 10 according to the first embodiment, and detailed description thereof will be omitted.

The electronic apparatus 10A of the present embodiment includes a hinge device 14A and a protruding portion 20A having different configurations from the hinge device 14 and the protruding portion 20 of the electronic apparatus 10 of the first embodiment described above. The protruding portion 20 of the electronic apparatus 10 described above is formed integrally with the first chassis 11. On the other hand, the protruding portion 20A of the electronic apparatus 10A of the present embodiment is configured to be separate from the first chassis 11 and is connected to the first chassis 11 to be relatively rotatable, as illustrated in FIGS. 5 to 6C. In addition, the hinge device 14A of the present embodiment connects the protruding portion 20A and the second chassis 12 so as to be relatively rotatable, and connects the protruding portion 20A and the first chassis 11 to be relatively rotatable.

The electronic apparatus 10A includes the hinge device 14A and the protruding portion 20A, thereby enabling rotation between the chassis 11 and 12 from the 0-degree posture to the 360-degree posture beyond the 180-degree posture. The appearance of the electronic apparatus 10A in a plan view in the 120-degree posture or the 0-degree posture is substantially the same as the appearance of the electronic apparatus 10 illustrated in FIGS. 1 and 2. Therefore, the reference numerals of the electronic apparatus 10A, the hinge device 14A, and the protruding portion 20A are added in parentheses in FIGS. 1 and 2, and a general view of the electronic apparatus 10A in the 120-degree posture and the 0-degree posture is not illustrated.

Figure 7A:
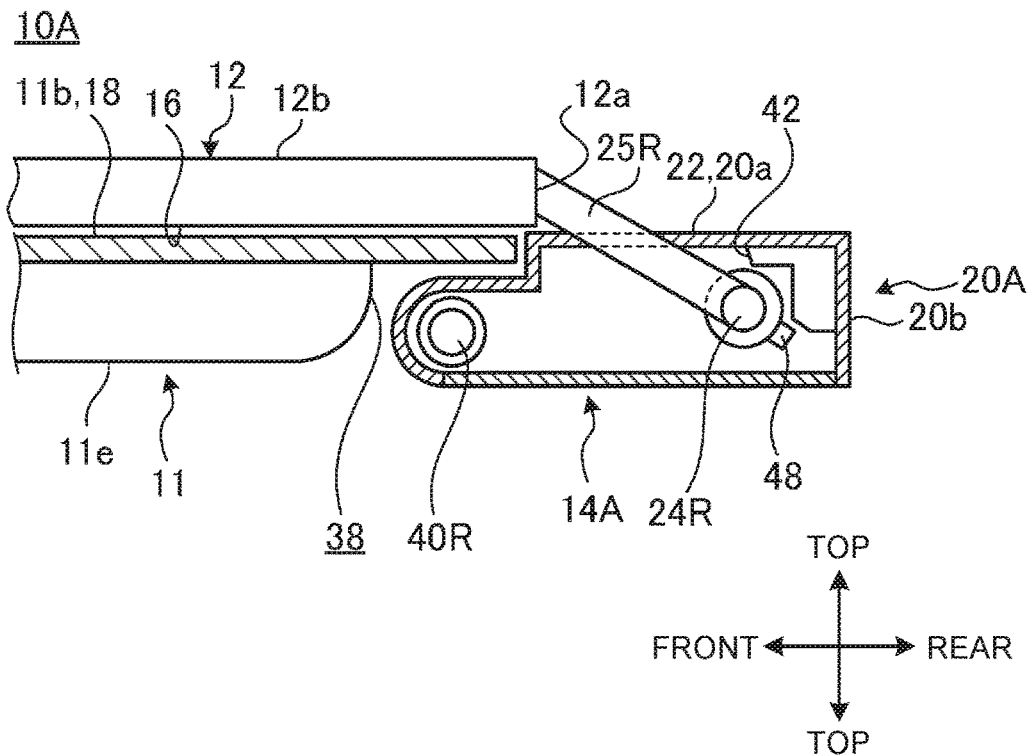
FIG. 7A is an enlarged schematic partial cross-sectional side view of the hinge device and the peripheral portion thereof in the 0-degree posture.
Figure 7B:
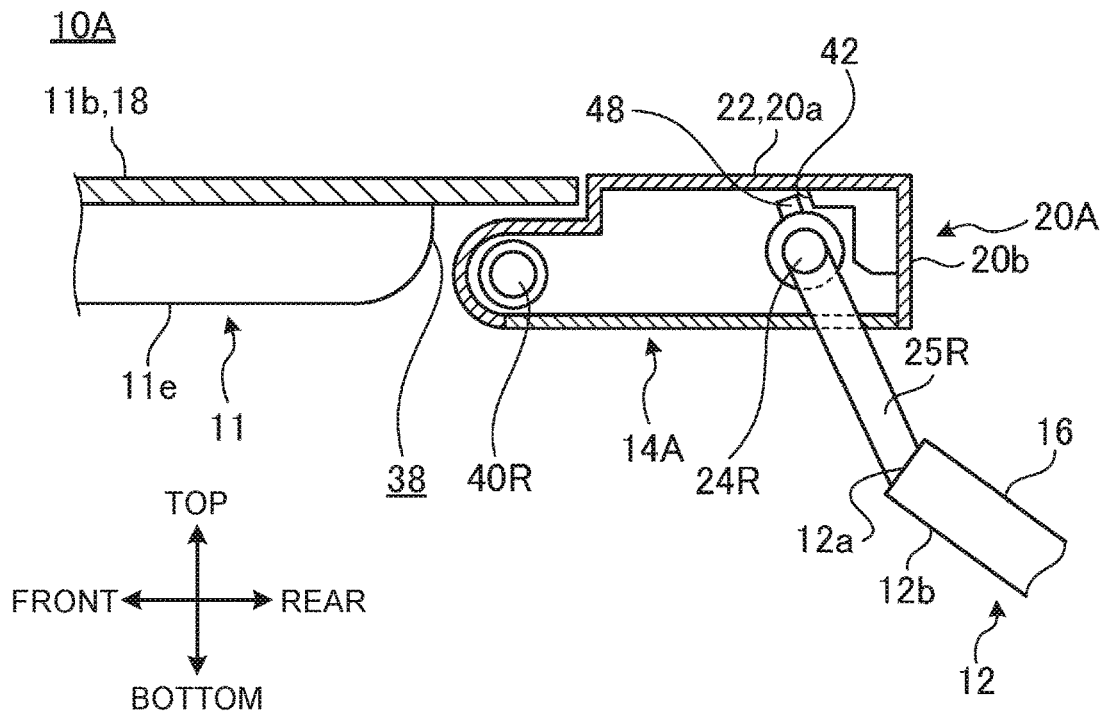
FIG. 7B is a partial cross-sectional side view in a state where the chassis illustrated in FIG. 7A is in a 225-degree posture.
Figure 7C:
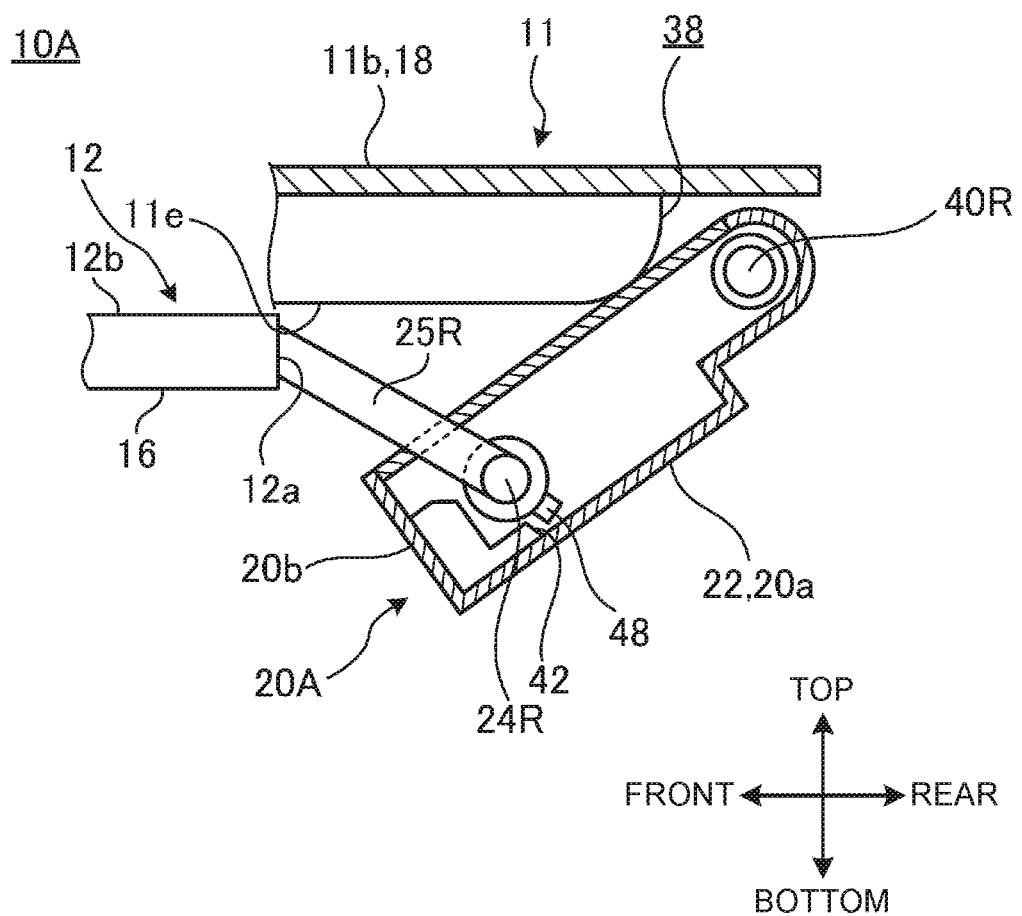
FIG. 7C is a partial cross-sectional side view in a state where the chassis illustrated in FIG. 7A is in the 360-degree posture.
Figure 8:
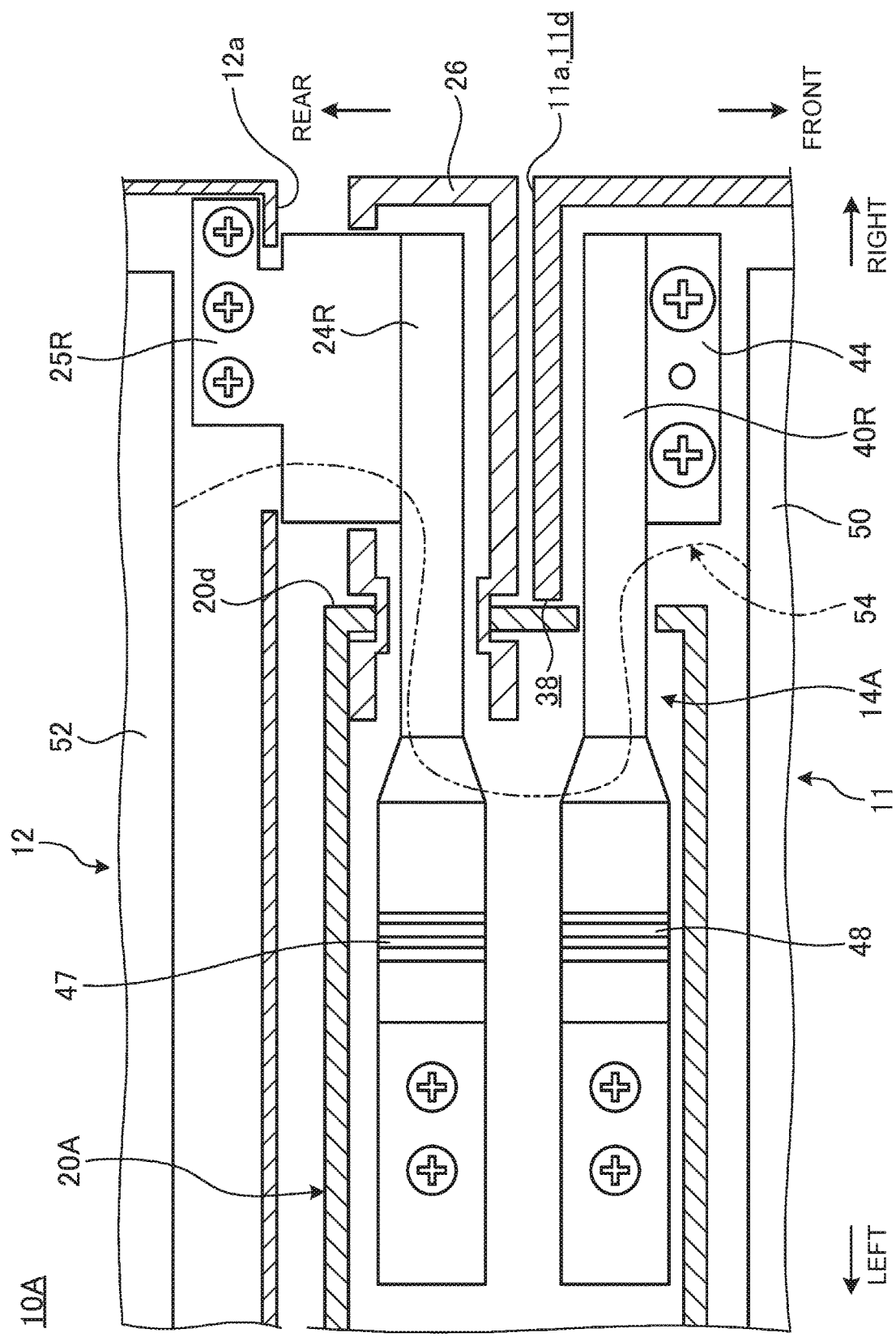
FIG. 8 is an enlarged schematic plan cross-sectional view of the hinge device and the peripheral portion thereof in the 180-degree posture.

FIG. 7A is an enlarged schematic partial cross-sectional side view of the hinge device 14A and the peripheral portion thereof in the 0-degree posture. FIGS. 7B and 7C are partial cross-sectional side views of the chassis 11 and 12 illustrated in FIG. 7A in a state where the chassis 11 and 12 are in a 225-degree posture and the 120-degree posture, respectively. FIGS. 7A to 7C are schematic views illustrating a cross section of the protruding portion 20A illustrated in FIGS. 6A to 6C. FIG. 8 is an enlarged schematic plan cross-sectional view of the hinge device 14A and the peripheral portion thereof in the 180-degree posture.

As illustrated in FIGS. 5 and 8, the first chassis 11 of the electronic apparatus 10A has a recessed portion 38 that is mostly recessed toward the front side except for both side portions (left and right portions) of the one edge portion 11a in the longitudinal direction. The protruding portion 20A is disposed so that a substantially front half portion is inserted into the recessed portion 38 in the front-rear direction and a substantially rear half portion protrudes to the rear side from the one edge portion 11a in the same manner as the above-described protruding portion 20 (see also FIGS. 6A, 6B, 7A, and 7B). In the electronic apparatus 10A, the recessed portions 11c and 11d are formed between the end surfaces 20c and 20d of the substantially rear half portion of the protruding portion 20A that protrudes to the rear side from the one edge portion 11a and the one edge portion 11a.

As illustrated in FIGS. 7A to 8, the hinge device 14A of the present embodiment includes a pair of left and right hinge shafts 24L and 24R, a pair of left and right hinge arms 25L and 25R, and a pair of left and right second hinge shafts 40L and 40R, and a stopper portion 42.

In the hinge device 14A of the present embodiment, since the configuration of the left and right hinge shafts 24L and 24R and the peripheral portions thereof may have a bilaterally symmetrical structure, the two may be hereinafter referred to as a "hinge shaft 24" without distinction. Similarly, the left and right hinge arms 25L and 25R may also be referred to as a "hinge arm 25" and the left and right second hinge shafts 40L and 40R may also be referred to as a "second hinge shaft 40".

The hinge shaft 24 and the hinge arm 25 of the hinge device 14A may have the same or a similar configuration as in the hinge device 14 of the first embodiment described above.

The hinge shaft 40 is a metal shaft that serves as a rotation shaft between the protruding portion 20A and the first chassis 11. The hinge shaft 40 connects the substantially front half portion of the protruding portion 20A inserted into the recessed portion 38 and the first chassis 11. The hinge shaft 40 has a first end portion that penetrates an inside surface of the recessed portion 38 to be inserted into the first chassis 11, and a second end portion that penetrates a side surface of the substantially front half portion of the protruding portion 20A inserted into the recessed portion 38 and is inserted into the protruding portion 20A.

As illustrated in FIG. 8, the first end portion of the hinge shaft 40 is integrally fixed with the connection plate 44, and is screwed and fixed to the first chassis 11 via the connection plate 44. The second end portion of the hinge shaft 40 is supported in the protruding portion 20A with respect to the torque generator 46 screwed and fixed to the protruding portion 20A, and is capable of relatively rotating with respect to the protruding portion 20A with a predetermined rotational torque. That is, the hinge shaft 40 has a first end portion that is fixed to the first chassis 11 to be relatively non-rotatable, and a second end portion that is supported to be relatively rotatable with respect to the protruding portion 20A via the torque generator 46. As a result, the hinge shaft 40 relatively rotatably connects the protruding portion 20A with respect to the first chassis 11.

As illustrated in FIG. 8, the first end portion of the hinge shaft 24 is integrally fixed with the hinge arm 25, and is screwed and fixed to the second chassis 12 via the hinge arm 25. The second end portion of the hinge shaft 24 is supported in the protruding portion 20A with respect to the torque generator 47 screwed and fixed to the protruding portion 20A, and is capable of relatively rotating with respect to the protruding portion 20A with a predetermined rotational torque. That is, the hinge shaft 24 has the first end portion that is fixed to the second chassis 12 via the hinge arm 25 to be relatively non-rotatable, and the second end portion that is supported to be relatively rotatable with respect to the protruding portion 20A via the torque generator 47. As a result, the hinge shaft 24 relatively rotatably connects the second chassis 12 with respect to the protruding portion 20A.

The torque generators 46 and 47 support the hinge shafts 40 and 24 to be relatively rotatable in a state where a predetermined rotational torque is applied thereto. The torque generators 46 and 47 may generate a predetermined rotational torque by, for example, laminating disk springs in the axial direction of the hinge shafts 40 and 24. In the case of the present embodiment, the rotational torque of the hinge shaft 40 generated by the torque generator 46 is larger than the rotational torque of the hinge shaft 24 generated by the torque generator 47.

In this manner, the hinge device 14A functions as a hinge chassis in which the protruding portion 20A supports the two hinge shafts 24 and 40.

As illustrated in FIGS. 7A to 7C, the stopper portion 42 is a wall portion or a convex provided inside the protruding portion 20A, which serves as the hinge chassis. In the hinge shaft 24 that connects the second chassis 12 and the protruding portion 20A, a protrusion 48 protrudes from an outer peripheral surface of a part inserted into the protruding portion 20A. The protrusion 48 does not come into contact with the stopper portion 42 while the hinge shaft 24 is in a range from 0 degrees to a predetermined rotation angle, and allows rotation of the hinge shaft 24. The protrusion 48 comes into contact with the stopper portion 42 when the hinge shaft 24 has a predetermined rotation angle, 225 degrees in the present embodiment, and regulates further rotation of the hinge shaft 24.

Reference numeral 50 in FIG. 8 is a motherboard that is accommodated in the first chassis 11 and on which the CPU 17 is mounted. Reference numeral 52 in FIG. 8 is a control board that is accommodated in the second chassis 12 and performs display control on the display 16. The control board 52 and the motherboard 50 are connected by a wire 54 passing through the hinge device 14 and the protruding portion 20A.

As illustrated in FIGS. 6A to 6C, in the present embodiment, when the second chassis 12 rotates from the 0-degree posture toward the 180-degree posture, the second chassis 12 turns so as to straddle the protruding portion 20A from the front side to the rear side without interfering with the protruding portion 20A. Therefore, as illustrated in FIG. 6A, the length L1 from the center of the hinge shaft 24 to the tip end of the hinge arm 25 connected to the one edge portion 11a of the second chassis 12 is longer than the distance L2 between the center of the hinge shaft 24 and the protruding end surface 20b of the protruding portion 20A. As a result, also in the hinge device 14A, the pair of hinge arms 25L and 25R are provided to be rotatable in a state where the protruding portion 20 is straddled in the longitudinal direction (left-right direction) therebetween. Then, when the pair of hinge arms 25L and 25R rotate, the second chassis 12 rotates such that the one edge portion 12a wraps around the protruding end surface 20b of the protruding portion 20.

Next, the operation and effects of the electronic apparatus 10A of the present embodiment will be described.

First, in the 0-degree posture illustrated in FIGS. 6A and 7A, the one edge portion 12a of the second chassis 12 is disposed substantially evenly with the one edge portion 11a of the first chassis 11 top and bottom, and the protruding portion 20A protrudes to the rear side thereof. As a result, in the electronic apparatus 10A, the sub-display 22 that faces the top surface 20a of the protruding portion 20A is not covered by the second chassis 12 in the 0-degree posture, and is exposed in appearance. Therefore, in the electronic apparatus 10A, it is possible to display various types of information on the sub-display 22 in a state where the chassis 11 and 12 are closed, so that high convenience can be obtained.

Next, when the second chassis 12 is rotated from the 0-degree posture in the opening direction, the rotational torque of the hinge shaft 24 is smaller than the rotational torque of the second hinge shaft 40, so that only the hinge shaft 24 rotates. As a result, in the electronic apparatus 10A, the second chassis 12 is gradually raised while using the hinge arm 25 and the hinge shaft 24 as the center of rotation. Then, for example, in the 120-degree posture (or an angle in the vicinity of the posture) illustrated in FIG. 6B, the electronic apparatus 10A is in an aspect suitable for operating the keyboard 18 while visually recognizing the display 16.

At this time, even in the electronic apparatus 10A, the sub-display 22 is not covered by the second chassis 12 in the 120-degree posture, and is exposed in appearance. Therefore, also in the electronic apparatus 10A, it is possible to use the display 16 and the sub-display 22 in combination, so that it is possible to obtain high convenience.

Next, when the second chassis 12 is further rotated from the 120-degree posture in the opening direction, the protrusion 48 comes into contact with the stopper portion 42 in the 225-degree posture, and further rotation of the hinge shaft 24 is regulated. When the second chassis 12 is further rotated from the 225-degree posture in the opening direction, the second hinge shaft 40 starts to rotate this time. That is, in this case, in a state where the protruding portion 20A and the second chassis 12 are integrally fixed, both the protruding portions 20A and the second chassis 12 relatively rotate with respect to the first chassis 11 while using the second hinge shaft 40 as the center of rotation.

In the 360-degree posture illustrated in FIGS. 5, 6C, and 7C, the second chassis 12 is laminated on the side of the bottom surface 11e of the first chassis 11 in the electronic apparatus 10A. At this time, the first chassis 11 and the second chassis 12 are laminated in a state where the rear surfaces of the keyboard 18 and the display 16, specifically, the bottom surface 11e and the rear surface 12b face each other.

In the electronic apparatus 10A, in the 360-degree posture, the top surface 20a of the protruding portion 20A is in a posture of being inclined by about 45 degrees with respect to the surface normal direction of the first chassis 11. Therefore, in the electronic apparatus 10A, the sub-display 22 inclined at a 45-degree posture is disposed to be aligned with one side portion (rear side) of the display 16. As a result, as illustrated in FIG. 5, it is possible to use the electronic apparatus 10A as the tablet PC in which the display 16 is used as the main display, and, at this time, it is possible to display, for example, icons, or the like for an auxiliary function, an extended function, or the like of the display 16 on the sub-display 22.

In this manner, in the electronic apparatus 10A, it is possible to use the display 16 and the sub-display 22 in combination even in a mode of using the tablet PC in which the chassis 11 and 12 are in the 360-degree posture, so that it is possible to obtain high convenience.

As described above, the electronic apparatuses 10 and 10A of the respective embodiments include protruding portions 20 and 20A that protrude toward the rear side from the one edge portion 11a of the first chassis 11. Here, the hinge devices 14 and 14A include a pair of hinge shafts 24L and 24R that are connected to both end surfaces 20c and 20d of the protruding portion 20 in a longitudinal direction and relatively rotatably connect the protruding portion 20 and the second chassis 12, and a pair of hinge arms 25L and 25R that integrally fix between each of the pair of hinge shafts 24L and 24R and the one edge portion 12a of the second chassis 12. The electronic apparatuses 10 and 10A are mounted on the protruding portions 20 and 20A, and are disposed to face the top surfaces 20a of the protruding portions 20 and 20A, thereby having the sub-display 22 that is positioned on the rear side of the keyboard 18.

In this manner, in the electronic apparatuses 10 and 10A, the hinge shaft 24 is connected to the left and right end surfaces 20c and 20d of the protruding portions 20 and 20A, and the hinge arm 25 is integrally fixed to the hinge shaft 24, so that the hinge devices 14 and 14A connect the chassis 11 and 12 to be relatively rotatable. As a result, in the electronic apparatuses 10 and 10A, it is possible to perform rotation between the chassis 11 and 12 in a state where the sub-displays 22 provided to the protruding portions 20 and 20A are always exposed in appearance. That is, in the electronic apparatuses 10 and 10A, it is possible to use the sub-display 22 regardless of the rotation angle between the chassis 11 and 12, so that it is possible to obtain high convenience.

In particular, in the electronic apparatuses 10 and 10A, the pair of hinge arms 25L and 25R are provided in a state of straddling the protruding portion 20 therebetween in the longitudinal direction. Then, the one edge portion 12a of the second chassis 12 is rotatable to wrap around the protruding end surface 20b when the pair of hinge arms 25L and 25R rotate. As a result, the electronic apparatus 10 enables a smoother rotational movement of the second chassis 12 in a state where the sub-display 22 is exposed in appearance.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 10, 10A electronic apparatus
11 first chassis
12 second chassis
14, 14A hinge device
16 display
18 Keyboard
20, 20A protruding portion
22 sub-display
24L, 24R hinge shaft
25L, 25R hinge arm
31 heat pipe
32 heat sink
34 exhaust port
40L, 40R second hinge shaft
46, 47 torque generator

What is claimed is:
1. An electronic apparatus comprising:
a first chassis comprising a first edge that comprises a protruding portion disposed between two end portions of the first edge in a longitudinal direction;
a second chassis, comprising a second edge, that is mounted with a display;
a hinge device that relatively rotatably connects the first edge to the second edge; and
a sub-display, wherein
the protruding portion protrudes farther toward a rear side of the electronic apparatus than the two end portions,
the hinge device comprises:
a pair of hinge shafts that are connected to side surfaces of both ends of the protruding portion in the longitudinal direction, and relatively rotatably connect the protruding portion and the second chassis, and
a pair of hinge arms that integrally fix each of the pair of hinge shafts and the second edge, and
the sub-display is mounted on the protruding portion such that the sub-display is not covered by the second chassis when the first chassis is disposed on the second chassis by the hinge device.

2. An electronic apparatus comprising:
a first chassis comprising a first edge that comprises a protruding portion disposed between two end portions of the first edge in a longitudinal direction;
a second chassis, comprising a second edge, that is mounted with a display;
a hinge device that relatively rotatably connects the first edge to the second edge; and
a sub-display, wherein
the protruding portion protrudes toward a rear side of the electronic apparatus,
the hinge device comprises:
  a pair of hinge shafts that are connected to side surfaces of both ends of the protruding portion in the longitudinal direction, and relatively rotatably connect the protruding portion and the second chassis, and
  a pair of hinge arms that integrally fix each of the pair of hinge shafts and the second edge,
the sub-display is mounted on the protruding portion and faces a front surface of the protruding portion,
a length from one of the hinge shafts to tip ends of the pair of hinge arms is configured to be longer than a distance between the one of the hinge shafts and a protruding end surface of the protruding portion, so that the pair of hinge arms are provided in a state of straddling the protruding portion between the pair of hinge arms in the longitudinal direction, and
the second edge is rotatable to wrap around the protruding end surface when the pair of hinge arms rotate.

3. The electronic apparatus according to claim 2, wherein the hinge device further includes a pair of second hinge shafts that relatively rotatably connect the protruding portion and the first chassis.

4. The electronic apparatus according to claim 3, wherein rotational torque of the pair of second hinge shafts is larger than rotational torque of the hinge shafts.

5. The electronic apparatus according to claim 3, wherein
the hinge device connects the first chassis and the second chassis to be rotatable between a first angle at which the first chassis and the second chassis are laminated with each other and the display faces a front surface of the first chassis and a second angle at which the first chassis and the second chassis are laminated in a state where rear surfaces face each other, and
the sub-display is disposed to be aligned with one side portion of the display at the second angle.

6. An electronic apparatus comprising:
a first chassis comprising a first edge that comprises a protruding portion disposed between two end portions of the first edge in a longitudinal direction;
a second chassis, comprising a second edge, that is mounted with a display;
a hinge device that relatively rotatably connects the first edge to the second edge;
a sub-display; and
inside the first chassis:
  a heating element;
  a heat pipe that absorbs and transports heat of the heating element; and
  a heat sink that radiates the heat transported by the heat pipe, wherein the protruding portion protrudes toward a rear side of the electronic apparatus,
the hinge device comprises:
  a pair of hinge shafts that are connected to side surfaces of both ends of the protruding portion in the longitudinal direction, and relatively rotatably connect the protruding portion and the second chassis, and
  a pair of hinge arms that integrally fix each of the pair of hinge shafts and the second edge,
the sub-display is mounted on the protruding portion and faces a front surface of the protruding portion,
at least a part of the heat sink and the heat pipe is accommodated in the protruding portion, and
the heat sink and the heat pipe are disposed below the sub-display.

7. The electronic apparatus according to claim 6, wherein the first chassis has an exhaust port that is open to a protruding end surface of the protruding portion and faces the heat sink.

8. The electronic apparatus according to claim 6, further comprising:
a keyboard that faces a front surface of the first chassis, wherein
the heat sink and the heat pipe are at positions that do not overlap the keyboard in a thickness direction of the first chassis.

* * * * *